(12) United States Patent
Tai et al.

(10) Patent No.: US 12,152,639 B2
(45) Date of Patent: Nov. 26, 2024

(54) COUPLING MONITORING SYSTEM AND METHOD OF USING SAME

(71) Applicants: TAIWAN SEMICONDUCTOR MANUFACTURING COMPANY, LTD., Hsinchu (TW); TSMC NANJING COMPANY, LIMITED, Nanjing (CN)

(72) Inventors: Wen Feng Tai, Hsinchu (TW); Lung Chi Yu, Hsinchu (TW); Po Chang Wang, Hsinchu (TW); Jui Pin Chang, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN)

( * ) Notice: Subject to any disclaimer, the term of this patent is extended or adjusted under 35 U.S.C. 154(b) by 792 days.

(21) Appl. No.: 17/174,957

(22) Filed: Feb. 12, 2021

(65) Prior Publication Data
US 2022/0243773 A1 Aug. 4, 2022

(30) Foreign Application Priority Data
Feb. 1, 2021 (CN) .......................... 202110135557.6

(51) Int. Cl.
*F16D 3/72* (2006.01)
*F16B 7/00* (2006.01)
(Continued)

(52) U.S. Cl.
CPC .................. *F16D 3/72* (2013.01); *F16B 7/00* (2013.01); *F16D 3/74* (2013.01); *G01V 8/20* (2013.01); *G05B 15/02* (2013.01); *G08B 5/36* (2013.01); *G08B 21/182* (2013.01); *F16D 2200/0013* (2013.01); *F16D 2200/0021* (2013.01); *F16D 2200/003* (2013.01); *F16D 2200/0056* (2013.01); *F16D 2300/18* (2013.01); *F16D 2300/20* (2021.01)

(58) Field of Classification Search
CPC .... F16D 3/72; F16D 2300/20; F16D 2300/18; F16D 2500/10406; F16D 2500/50275
See application file for complete search history.

(56) References Cited

U.S. PATENT DOCUMENTS
4,102,052 A 7/1978 Bloch

FOREIGN PATENT DOCUMENTS
CN 106627591 A * 5/2017
CN 110132581 8/2019
(Continued)

OTHER PUBLICATIONS

Office Action dated Jan. 26, 2022 for corresponding case No. TW 11120094250. (pp. 1-4).

*Primary Examiner* — Maurice C Smith
(74) *Attorney, Agent, or Firm* — Hauptman Ham, LLP (57) ABSTRACT

A coupling including a main body, a first hub at a first end of the main body and a second hub at a second end of the main body opposite the first end is provided. The first hub includes a first inner bore configured to receive a first shaft and a pair of aligned first and second through holes extending through opposite walls of the first hub. The first through hole and the second through hole are in optical communication with the first inner bore.

20 Claims, 4 Drawing Sheets (51) Int. Cl.
*F16D 3/74* (2006.01)
*G01V 8/20* (2006.01)
*G05B 15/02* (2006.01)
*G08B 5/36* (2006.01)
*G08B 21/18* (2006.01)

(56) References Cited

FOREIGN PATENT DOCUMENTS

| | | | |
|---|---|---|---|
| CN | 209387285 | 9/2019 | |
| CN | 111982508 | 11/2020 | |
| DE | 202010012659 | 12/2010 | |
| KR | 100488561 B1 * | 7/2002 | ............ F16D 27/112 |
| WO | 2008089742 | 7/2008 | |

* cited by examiner

COUPLING MONITORING SYSTEM AND METHOD OF USING SAME

BACKGROUND

A coupling is a mechanical device used to connect two shafts, end to end and in the same line. Both shafts are locked together by the coupling and turn at the same speed, transmitting torque from a driving side to a driven side. Some couplings permit some degree of parallel, axial, or angular misalignment between the two shafts. Coupling is used in a direct mechanical drive system for driving devices in the mechanical drive system.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Generally, a coupling includes a pair of axially spaced hubs mounted to ends of corresponding shafts. The hubs are locked to the corresponding shafts by a locking element such as keys or screws to reduce or prevent both axial and rotary motions of the hubs with respect to the shafts during operation of the coupling. Proper positioning of the shafts within the hubs that ensures correct locking between the shaft and hub helps to achieve maximum output and machinery longevity. However, the hub has a hollow cylindrical shape such that once the shaft is enclosed in the hub, automated determination of whether the shaft is properly positioned in the hub after installation is difficult. When the coupling is in operation, incorrect locking between the shaft and the hub due to the improper positioning of the shaft in the hub increases the risk of the locking between the shaft and the hub becoming loose. In some instances, even if the shaft is properly locked initially, vibration of the machinery still causes the locking between the shaft and the hub becoming loose after a long time of use. The shaft thus tends to "drift" away from an initial position, resulting in the displacement of the shaft in an axial direction of the coupling. The shaft displacement in the axial direction will lead to degradation of torque-carrying capacity of the coupling, and if severe enough, will lead to failure of engagement between the shaft and the hub.

The failure of engagement between the shaft and the hub results in poor product repeatability and yield. For example, some semiconductor device fabrication processes use plasma at different stages, including etching of materials on substrates, deposition of materials onto substrates, cleaning of substrate surfaces, and modification of substrate surfaces. A plasma processing process involves energizing a gas mixture by imparting energy to gas molecules through introducing radio frequency (RF) energy into the gas mixture. To generate plasma efficiently, a RF power source supplies a maximum RF power to the gas mixture and the impedance of the RF power supply is matched to the plasma source. Matching the impedance is accomplished by adjusting capacitances of variable capacitors in a matching network. In some instances, the capacitance of a variable capacitor is adjusted by rotation of a driving motor that is connected to the variable capacitor using a coupling. The disengagement of the shaft and the hub in the coupling reduces plasma generation efficiency and results in poor product consistency and yield in some instances.

According to some embodiments of the current description, a pair of aligned through holes are provided on opposite sides of each hub in a coupling. Each pair of through holes is configured to allow automated monitoring of positions of a shaft in a corresponding hub using a sensor system after the coupling and the shafts are assembled and during operating intermissions of the coupling. In situ monitoring positions of shafts within the corresponding hubs during continuous use of the coupling helps to obtain information with respect to the extent of axial displacement of respective shafts in the hubs over time. The information related to the axial displacements of shafts helps to better manage the operation of the coupling and semiconductor process tools associated with the coupling, and thereby helps to ensure and maintain stability, repeatability and yield in the integrated circuit fabrication process.

Figure 1:
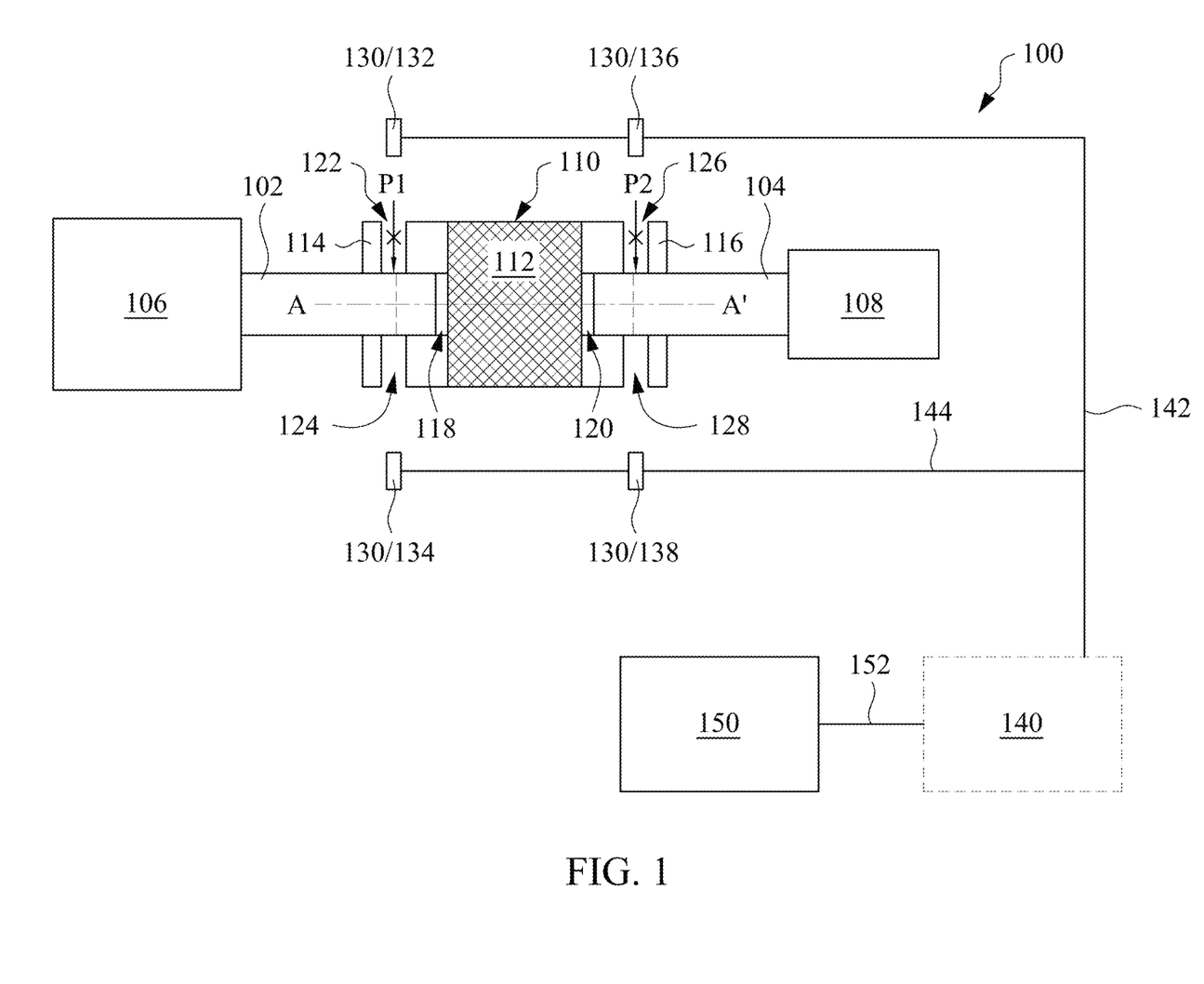
FIG. 1 is a diagram of a coupling monitoring system, in accordance with one or more embodiments.
Figure 2:
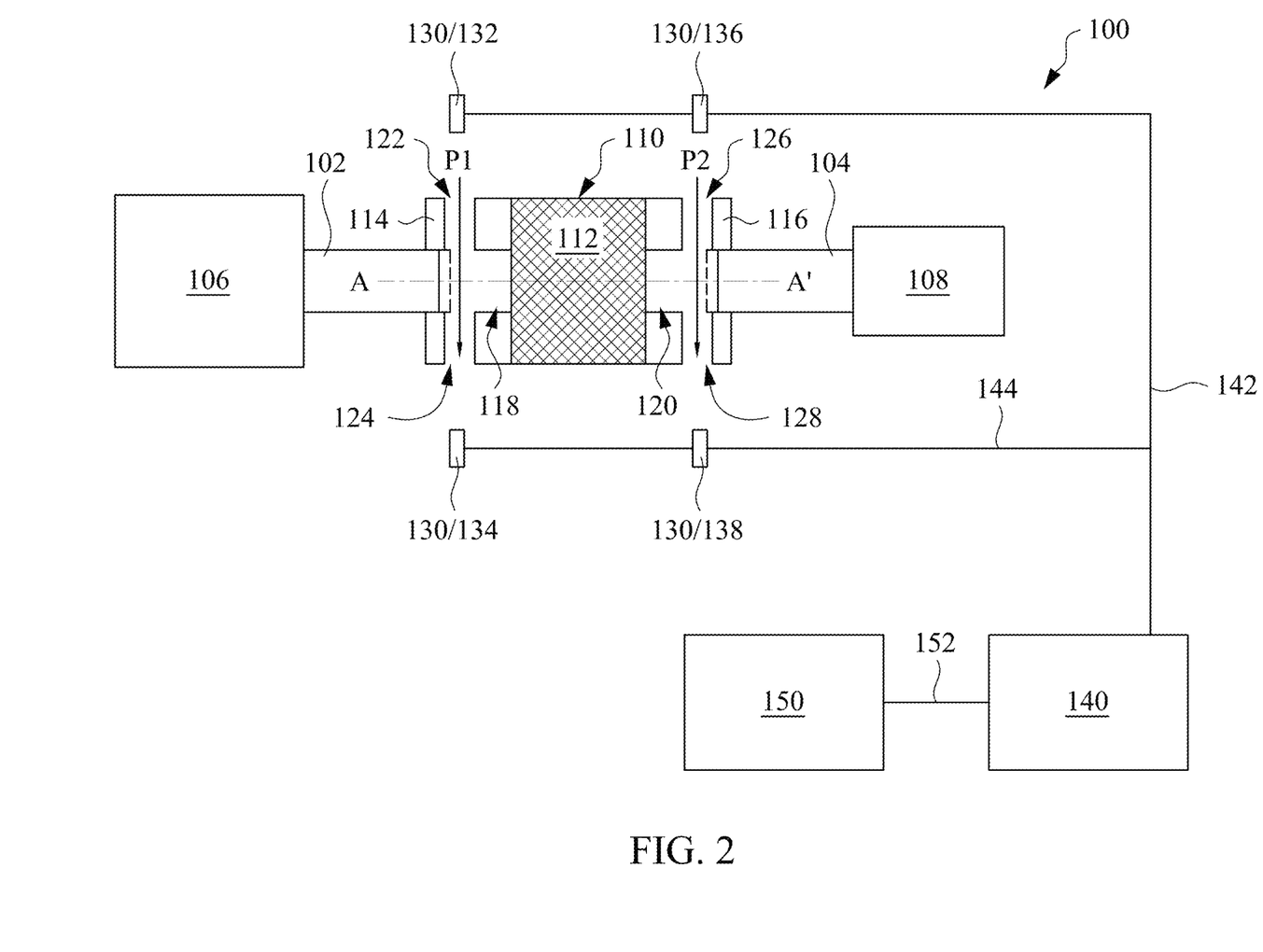
FIG. 2 is a diagram of a coupling monitoring system, in accordance with one or more embodiments.

FIGS. 1 and 2 are diagrams of a coupling monitoring system 100, in accordance with one or more embodiments. FIG. 1 is a diagram of the coupling monitoring system 100 at a first shaft position setting. The first shaft position setting corresponds to positions of shafts where shafts are properly locked or before axial displacements of shafts have reached corresponding displacement thresholds. FIG. 2 is a diagram of the coupling monitoring system 100 at a second shaft position setting. The second shaft position setting corresponds to positions of shafts where shafts are improperly locked or after axial displacements of shafts have reached the corresponding displacement thresholds.

Referring to FIGS. 1 and 2, the coupling monitoring system 100 includes a coupling 110 for transmitting torque between two axially spaced shafts, i.e., a first shaft 102 and a second shaft 104. In some embodiments, the first shaft 102 acts as a driving shaft and is coupled to a driving device 106. The second shaft 104 acts as a driven shaft and is coupled to a load device 108. In some embodiments, the first shaft 102 and the second shaft 104 are arranged to rotate about a longitudinal axis A-A' of the coupling 110. The coupling monitoring system 100 further includes a sensor system 130 for monitoring positions of first shaft 102 and second shaft 104 in the coupling 110 before or during continuous use of the coupling 110. A data acquisition (DAQ) system 140 is coupled to various components of the sensor system 130 and is configured to convert signals received from the sensor system 130 to signals readable and interpretable by a fault detection and classification (FDC) system 150. The FDC system 150 is coupled to the DAQ system 140 and is configured to determine whether a light intensity received from the DAQ system 140 exceeds an intensity threshold that indicates the disengagement of shaft 102 or 104 from the coupling 110 is about to occur and to generate an output signal to trigger an alarm and/or stop operation of the semiconductor process tool associated with the coupling once the light intensity exceeds the intensity threshold.

The driving device 106 is configured to drive the load device 108 via the first shaft 102, the coupling 110, and the second shaft 104. In some embodiments, the driving device 106 is an electric motor such as, for example, a stepper motor or a continuously driven motor. In some embodiments, the load device 108 is a variable capacitor, and the capacitance of the variable capacitor varies in response to the rotation caused by the driving device 106.

The coupling 110 is configured to couple the first shaft 102 and the second shaft 104. In some embodiments, the coupling 110 includes a main body 112, a first hub 114 and a second hub 116. The first hub 114 and the second hub 116 are located on opposite ends of the main body 112 and joined by the main body 112. In some embodiments, the first hub 114 and the second hub 116 have the same size and shape. In some embodiments, the first hub 114 and the second hub 116 have different sizes and shapes.

In some embodiments, the main body 112 is configured to permit some degree of misalignment such as shaft angular misalignment or shaft offset misalignment between the first shaft 102 and the second shaft 104, while still allowing torque to be effectively transmitted from the first shaft 102 to the second shaft 104. In some embodiments, the main body 112 is a metal bellows made of stainless steel. In some embodiments, the metal bellows has a spiral or coiled shape. In some embodiments, the main body 112 is formed of an elastomeric material such as, for example, rubber, urethane, or polyetheretherketone (PEEK). In some embodiments, the main body 112 has a cylindrical shape. In some embodiments, the main body 112 has a polygonal shape.

The first hub 114 is configured to be removably mounted on the first shaft 102, and the second hub 116 is configured to be removably mounted on the second shaft 104. In some embodiments, the first hub 114 includes a longitudinally centered inner bore 118 extending therethrough. In some embodiments, the second hub 116 includes a longitudinally centered inner bore 120 extending therethrough. The inner bore 118 is used to receive an end portion of the first shaft 102, and the inner bore 120 is used to receive an end portion of the second shaft 104. In some embodiments, the inner bores 118 and 120 are independently rounded or D-shaped. In some embodiments, the inner bore 118 has the same dimensions as the inner bore 120. In some embodiments, the inner bore 118 has a different dimension from the inner bore 120. In some embodiments, at least one of the inner bores 118 and 120 has a tapered shape with a dimension smaller than dimensions of the end portions of respective first and second shafts 102 and 104. In instances when the inner bore 118 has a tapered shape, the first hub 114 forms an interference fit with the first shaft 102 once the first shaft 102 is received in the inner bore 118. In instances when the inner bore 120 has a tapered shape, the second hub 116 forms an interference fit with the second shaft 104 once the second shaft 104 is received in the inner bore 120. After the first and second shafts 102, 104 are inserted into corresponding inner bores 118 and 120, the first and second shafts 102, 104 are secured to the corresponding hubs 114, 116 by fastening elements (not shown). Examples of fastening elements include, but are not limited to, screws, pins, keys, and clamping rings. In some embodiments, the first and second hubs 114, 116 are independently made of an engineering material such as, for example, cast iron, stainless steel, aluminum, alloys, elastomeric materials or the like.

In some embodiments, each of the first and second hubs 114 and 116 is formed as a single piece. For example, each of the first and second hubs 114 and 116 has a hollow cylindrical shape enclosing the corresponding inner bore 118 or 120. In some embodiments, each of the first and second hubs 114 and 116 has a split hub design such that each of the first and second hubs 114 and 116 is split axially into a pair of semi-arcuate halves. When assembled, a first half of a split hub is put onto a shaft, and a second half of the split hub is then mounted to the first half, thereby defining the inner bore 118 or 120.

The first hub 114 includes at least one pair of aligned through holes, e.g., through holes 122 and 124, extending radially through opposite walls of the first hub 114. The through holes 122 and 124 each extend in a radial direction transverse to the longitudinal axis A-A' of the coupling 110. In some embodiments, the through holes 122 and 124 each extend in a direction perpendicular to the longitudinal axis A-A' of the coupling 110. The through hole 122 intersects the inner bore 118 on a first side of the inner bore 118, and the through hole 124 intersects the inner bore 118 on a second side of the inner bore 118 opposite the first side. The through holes 122 and 124 are in optical communication with the inner bore 118, and together through holes 122, 124 and inner bore 118 define a first light passageway P1. The first light passageway P1 is usable to in-situ monitor positions of the first shaft 102 in the first hub 114 after assembly of the coupling 110 and shafts 102, 104 or during operating intermissions of the coupling 110. For example, in one instance, after the coupling 110 and the shafts 102, 104 are assembled and before operation of the coupling 110 starts, if the first shaft 102 is properly locked in the first hub 114, the first shaft 102 extends most or all the way through the first light passageway P1 as in FIG. 1. Consequently, the first light passageway P1 is blocked by the first shaft 102 to the extent such that no sufficient amount of light is able to pass through the first light passageway P1, and an alarm indicating that the first shaft 102 is not installed in a proper position will not be triggered. In contrast, if the first shaft 102 is improperly locked in the first hub 114, the first shaft 102 extends slightly into the first light passageway P1 or in some embodiments the first shaft 102 is completely outside of the first light passageway P1 as in FIG. 2. Consequently, the first light passageway P1 is substantially or completely cleared to allow a sufficient amount of light to pass through, thereby triggering the alarm. In another instance, after the coupling 100 has started to operate and during operating intermissions of the coupling 110, the sensor 130 detects a number of light transmissions over a time duration. The FDC system 150 determines whether the number of transmission over the time duration is within a normal operating range of the coupling 110. In some embodiments, the time duration is one second. In some embodiments, the time duration is multiple seconds. If the locking between the first shaft 102 and the first hub 114 is loose but the resulting axial displacement of the first shaft 102 has not reached a displacement threshold above which failure of engagement between the first shaft 102 and the first hub 114 is about to occur, the first shaft 102 extends mostly or completely through the first light passageway P1 as in FIG. 1. Consequently, the first light passageway P1 is blocked by the first shaft 102 to the extent such that no sufficient amount of light is able to pass through the first light passageway P1, and an alarm indicating that the first shaft 102 is in an abnormal operation position will not be triggered. In contrast, if the locking between the first shaft 102 and the first hub 114 is loose and the resulting axial displacement of the first shaft 102 has reached the displacement threshold, the first shaft 102 is substantially or completely outside of the first light passage way P1 as in FIG. 2. Consequently, the first light passageway P1 is cleared to the extent such that a sufficient amount of light is able to pass through the first light passageway P1 to trigger the alarm.

In some embodiments, the through holes 122 and 124 are positioned at a distal end of the first hub 114 away from the main body 112 of the coupling 110. The shapes and sizes of the through holes 122 and 124 are chosen to help ensure that a sufficient amount of light is able to be transmitted via the through holes 122 and 124, and be detected by the sensor system 130. In some embodiments, the through holes 122 and 124 independently have a linear shape, a rectangular shape, a square shape, a circular shape, an oval shape, or other suitable shapes. In some embodiments, the through hole 122 has the same shape as the through hole 124. In some embodiments, the through hole 122 has a different shape from the through hole 124. In some embodiments, the through hole 122 has the same size as the through hole 124. In some embodiments, the through hole 122 has a different size from the through hole 124. In some embodiments, the through hole 124 is formed to have a larger size than that of the through hole 122. In some embodiments, the through holes 122 and 124 independently have a dimension, such as diameter, length, width, or the like, ranging from 2 mm to 10 mm. If the size of through hole 122 or 124 is too small, the amount of light able to enter and pass through the first light passageway P1 is too low to be detected by the sensor system 130. If the size of through hole 122 or 124 is too large, the mechanical property of coupling 110 is unnecessarily deteriorated.

The second hub 116 includes at least one pair of aligned through holes, e.g., through holes 126 and 128, extending radially through opposite walls of the second hub 116. The through holes 126 and 128 each extend in a radial direction transverse to the longitudinal axis A-A' of the coupling 110. In some embodiments, the through holes 126 and 128 each extend in a direction perpendicular to the longitudinal axis A-A' of the coupling 110. The through hole 126 intersects the inner bore 120 on a first side of the inner bore 120, and the through hole 128 intersects the inner bore 120 on a second side of the inner bore 120 opposite the first side. The through holes 126 and 128 are in optical communication with the inner bore 120, and together through holes 126, 128 and inner bore 120 define a second light passageway P2. The second light passageway P2 is usable to in-situ monitor positions of the second shaft 104 in the second hub 116 after assembly of the coupling 110 and shafts 102, 104 or during operating intermissions of the coupling 110. For example, in one instance, after the coupling 110 and shafts 102, 104 are assembled and before operation of the coupling 110 starts, if the second shaft 104 is properly locked in the second hub 116, the second shaft 104 extends most or all the way through the second light passageway P2 as in FIG. 1. Consequently, the second light passageway P2 is blocked by the second shaft 104 to the extent such that no sufficient amount of light is able to pass through the second light passageway P2, and an alarm indicating that the second shaft 104 is not installed in a proper position will not be triggered. In contrast, if the second shaft 104 is improperly locked in the second hub 116, the second shaft 104 extends slightly into the second light passageway P2 or in some embodiments the second shaft 104 is completely outside of the second light passageway P2 as in FIG. 2. Consequently, the second light passageway P2 is substantially or completely cleared to allow a sufficient amount of light to pass through, thereby triggering the alarm. In another instance, after the coupling 110 has started to operate and during operating intermissions of the coupling 110, if the locking between the second shaft 104 and the second hub 116 is loosen but the resulting axial displacement of the second shaft 104 has not reached a displacement threshold above which failure of engagement between the second shaft 104 and the second hub 116 is about to occur, the second shaft 104 extends mostly or completely through the second light passageway P2 as in FIG. 1. Consequently, the second light passageway P2 is blocked by the second shaft 104 to the extent such that no sufficient amount of light is able to pass through the second light passageway P2, and an alarm indicating that the second shaft 104 is in an abnormal operation position will not be triggered. In contrast, if the locking between the second shaft 104 and the second hub 116 is loosen and the resulting axial displacement of the second shaft 104 has reached the displacement threshold, the second shaft 104 is substantially or completely outside of the second light passage way P2 as in FIG. 2. Consequently, the second light passageway P2 is cleared to the extent such that a sufficient amount of light is able to pass through the second light passageway P2 to trigger the alarm. Depending on the longitudinal lengths of the first hub 114 and the second hub 116, in instances where the second hub 116 has a longitudinal length the same as the longitudinal length of the first hub 114, the displacement threshold for the second shaft 104 is the same as the displacement threshold for the first shaft 102; while in instances where the second hub 116 has a longitudinal length different from the longitudinal length of the first hub 114, the displacement threshold for the second shaft 104 is different from the displacement threshold for the first shaft 102.

In some embodiments, the through holes 126 and 128 are positioned at a distal end of the second hub 116 away from the main body 112 of the coupling 110. The shapes and sizes of the through holes 126 and 128 are chosen to help ensure that a sufficient amount of light is able to be transmitted via the through holes 126 and 128, and be detected by the sensor system 130. In some embodiments, each of the through holes 126 and 128 in the second hub 116 is formed to have the same size and shape as the corresponding through holes 122 and 124 in the first hub 114. In some embodiments, each of the through holes 126 and 128 in the second hub 116 is formed to have different size and shape from the corresponding through holes 122 and 124 in the first hub 114. In some embodiments, the through holes 126 and 128 independently have a liner shape, a rectangular shape, a square shape, a circular shape, an oval shape, or other suitable shapes. In some embodiments, the through hole 126 has the same shape as the through hole 128. In some embodiments, the through hole 126 has a different shape from the through hole 128. In some embodiments, the through hole 126 has the same size as the through hole 128. In some embodiments, the through hole 126 has a different size from the through hole 128. In some embodiments, the through hole 128 is formed to have a larger size than that of the through hole 126. In some embodiments, the through holes 126 and 128 independently have a dimension, such as diameter, length, width, or the like, ranging from 2 mm to 10 mm. If the size of through hole 126 or 128 is too small, the amount of light able to enter and pass through the second light passageway P2 is too low to be detected by the sensor system 130. If the size of through hole 126 or 128 is too large, the mechanical property of coupling 110 is unnecessarily deteriorated.

Through holes 122, 124, 126 and 128 are formed by any known method in the art. In some embodiments, the through holes 122 and 124 are formed by drilling through the opposite walls of the first hub 114 along the radial direction of the first hub 114. Similarly, in some embodiments, the through holes 126 and 128 are formed by drilling through the opposite walls of the second hub 116 along the radial direction of the second hub 116. In some embodiments, the drilling is performed using a laser beam, a mechanical drill or another suitable tool. In some embodiments in which the first hub 114 is formed as separate pieces, through holes 122 and 124 are separately defined in the curved periphery of the separate pieces. In some embodiments in which the second hub 116 is formed as separate pieces, through holes 126 and 128 are separately defined in the curved periphery of the separate pieces. The concept of forming through holes on respective hubs of a coupling to allow monitoring positions of each shaft during continuous use of the coupling are applicable to couplings of any shapes and any configurations.

The sensor system 130 is configured to monitor positions of the first and second shafts 102 and 104 within corresponding first and second hubs 114 and 116. In some embodiments, the sensor system 130 is an optical sensor system. In some embodiments, the sensor system 130 includes a first light source 132 and a first light detector 134 configured to align with the first light passageway P1. For example, in FIGS. 1 and 2, the first light source 132 is disposed on a first side of the first hub 114 and in alignment with one through hole in the pair of through holes 122, 124, e.g., through hole 122, and the first light detector 134 is disposed on a second side of the first hub 114 opposite the first side and in alignment with another through hole in the pair of through holes 122, 124, e.g., through hole 124. The sensor system 130 further includes a second light source 136 and a second light detector 138 configured to align with the second light passageway P2. For example, in FIGS. 1 and 2, the second light source 136 is disposed on a first side of the second hub 116 and in alignment with one through hole in the pair of through holes 126, 128, e.g., through hole 126, and the second light detector 138 is disposed on a second side of the second hub 116 opposite the first side and in alignment with another through hole in the pair of through holes 126, 128, e.g., through hole 128.

The first light source 132 is configured to emit light towards one through hole in the pair of through holes 122, 124, e.g., through hole 122, such that the emitted light from the first light source 132 is able to enter and pass through the first light passageway P1, and be detected by the first light detector 134. The second light source 136 is configured to emit light towards one through hole in the pair of through holes 126, 128, e.g., through hole 126, such that the emitted light from the second light source 136 is able to enter and pass through the second light passageway P2, and be detected by the second light detector 138. In some embodiments, the first and second light sources 132 and 136 are independently a visible light source, or a non-visible light source. In some embodiments, the first light source 132 and the second light source 136 are the same type of light sources, e.g., visible light sources. In some embodiments, the first light source 132 and the second light source 136 are different types of light sources, e.g., the first light source 132 is a visible light source, and the second light source 136 is an infrared (IR) light source. In some embodiments, the light sources 132 and 136 independently include a Xenon (Xe) lamp, a laser diode, a light emitting diode, an IR emitter, an X-ray emitter, or other suitable light sources. In some embodiments, the first and second light source 132 and 136 independently include an integral lens or is combined with an external lens configured to focus the emitted light into the corresponding through hole, i.e. through hole 122 or through hole 126. Although two separate light sources 132, 136 are in the sensor system 130, one of ordinary in the skill would understand a single light source is applicable in the sensor system 130. In some instances where a single light source is used, a beam splitter is provided to split the light beam emitted from the single light source and direct the split beams towards corresponding light passageways P1, P2.

Each of the first and second light detectors 134 and 138 is configured to detect light emitted from the corresponding light source, i.e., the first light source 132 or the second light source 136 and passing through the corresponding light passageway P1 or P2. Each of the first and second light detectors 134 and 138 is also configured to convert the detected light into electronic signals which indicate characteristics of the detected light, such as the intensity of the detected light. In some embodiments, each of the first and second light detectors 134 and 138 is capable of detecting light based on the wavelength of light. In some embodiments, the first and second light detectors 134 and 138 are independently sensitive to visible light. In some embodiments, the first and second light detectors 134 and 138 are independently sensitive to IR light. In some embodiments, the first light detector 134 and the second light detector 138 are the same type of light detectors, e.g., visible light detectors. In some embodiments, the first light detector 134 and the second light detector 138 are different types of light detectors, e.g., the first light detector 134 is sensitive to visible light, and the second light detector 138 is sensitive to IR light.

The sensor system 130 provides information regarding the position of the first shaft 102 in the first hub 114 as well as the position of the second shaft 104 in the second hub 116. The position of the first shaft 102 in the first hub 114 or the position of the second shaft 104 in the second hub 116 is usable to determine whether the first shaft 102 or the second shaft 104 is properly locked within the corresponding hub, i.e. the first hub 114 or the second hub 116 after the coupling 110 and shafts 102 and 104 are assembled and before operation of the coupling 110 starts. In instances as in FIG. 1, when the first shaft 102 is properly locked in the first hub 114, the first light passageway P1 is blocked by the first shaft 102 to the extent such that an amount of light emitted by the first light source 132 and transmitted through the first light passageway P1 is too low to be detected by the first light detector 134. In contrast and as in FIG. 2, when the first shaft 102 is not properly locked in the first hub 114, the first light passageway P1 is cleared to the extent such that an amount of light emitted by the first light source 132 and transmitted through the first light passageway P1 is sufficient to cause the first light detector 134 to generate an output signal that is indicative of the improper locking between the first shaft 102 and the first hub 114. Likewise, in instances as in FIG. 1, when the second shaft 104 is properly locked in the second hub 116, the second light passageway P2 is blocked by the second shaft 104 to the extent such that an amount of light emitted by the second light source 136 and transmitted through the second light passageway P2 is too low to be detected by the second light detector 138. In contrast and as in FIG. 2, when the second shaft 104 is not properly locked in the second hub 116, the second light passageway P2 is cleared to the extent such that an amount of light emitted by the second light source 136 and transmitted through the second light passageway P2 is sufficient to cause the second light detector 138 to generate an output signal that is indicative of the improper locking between the second shaft 104 and the second hub 116.

The position of the first shaft 102 in the first hub 114 or the position of the second shaft 104 in the second hub 116 is also usable to determine whether the displacement of the first shaft 102 or the displacement of the second shaft 104 has reached a displacement threshold above which failure of the engagement between shafts 102, 104 and corresponding hubs 114, 116 is about to occur during continuous use of the coupling 110. In instances as in FIG. 1, when the axial displacement of the first shaft 102 in the first hub 114 is less than a displacement threshold above which failure of engagement between the first shaft 102 and the first hub 114 is about to occur, the first light passageway P1 is blocked by the first shaft 102 to the extent such that an amount of light emitted by the first light source 132 and transmitted through the first light passageway P1 is insufficient to cause the first light detector 134 to generate an output signal above a predetermined signal threshold that is indicative of the disengagement of the first shaft 102 from the first hub 114 is about to occur. In contrast and as in FIG. 2, in instances when the axial displacement of the first shaft 102 in the first hub 114 has reached the displacement threshold, the first light passageway P1 is cleared to the extent such that an amount of light emitted by the first light source 132 and transmitted through the first light passageway P1 is sufficient to cause the first light detector 134 to generate an output signal above the predetermined signal threshold. Likewise, in instances as in FIG. 1, when the axial displacement of the second shaft 104 in the second hub 116 is less than a displacement threshold above which failure of engagement between the second shaft 104 and the second hub 116 is about to occur, the second light passageway P2 is blocked by the second shaft 104 to the extent such that an amount of light emitted by the second light source 136 and transmitted pass through the second light passageway P2 is insufficient to cause the second light detector 136 to generate an output signal above a predetermined signal threshold that is indicative of the disengagement of the second shaft 104 from the second hub 116 is about to occur. In contrast and as in FIG. 2, in instances when the axial displacement of the second shaft 104 in the second hub 116 has reached the displacement threshold, the second light passageway P2 is cleared to the extent such that an amount of light emitted by the second light source 136 and transmitted through the second light passageway P2 is sufficient to cause the second light detector 138 to generate an output signal above the predetermined signal threshold.

The DAQ system 140 is coupled to the sensor system 130. In some embodiments, the DAQ system 140 communicates with the sensor system 130, including light sources 132, 136 and light detectors 134, 138, via corresponding lines 142 and 144. The DAQ system 140 receives/acquires, from the first light detector 134 and the second light detector 138, electrical signals indicative of intensities of light transmitted through the corresponding first light passageway P1 and second light passageway P2 and incident on the corresponding first light detector 134 and second light detector 138, and outputs the electrical signals in a form that is able to be read and interpreted by the FDC system 150. For example, the first light detector 134 provides electrical signals, such as analog signals, that indicate intensities of light transmitted through the first light passageway P1 and incident on the first light detector 134, while the second light detector 138 provides electrical signals, such as analog signals, that indicate intensities of light transmitted through the second light passageway P2 and incident on the second light detector 138, to the DAQ system 140. The DAQ system 140 then converts the analog signals to digital signals being readable and interpretable by the FDC system 150, and provides the digital signals to the FDC system 150. In some embodiments, the DAQ system 140 is omitted in instances where the light detectors 134 and 138 are able to generate electrical signals that are readable and interpretable by the FDC system 150. In some embodiments, the DAQ system 140 includes a current-voltage converter, a gain amplifier and an analog-to-digital converter.

The FDC system 150 is configured to evaluate parameters implemented, for example, by the DAQ system 140, or in some embodiments, directly by the sensor system 130, and identify abnormalities, or faults after the coupling 110 and shafts are assembled and before operation of the coupling starts, and/or during operating intermissions of the coupling 110. After the coupling 110 and shafts 102, 104 are assembled and before operation of the coupling 110 starts, an abnormality is detected when the first shaft 102 is not fully extended through the first light passageway P1 and/or the second shaft 104 is not fully extended through the second light passageway P2. Such abnormality indicates that the first shaft 102 is not properly installed within the first hub 114 and/or the second shaft 104 is not properly installed within the second hub 116. If the FDC system 150 detects an abnormality before the operation of the coupling 110 starts, the FDC system 150 outputs an alarm signal to notify factory personnel to adjust the position of the first shaft 102 within the first hub 114 and/or the position of the second shaft 104 within the second hub 116. During continuous use of the coupling 110, an abnormality is detected when the axial displacement of the first shaft 102 within the first hub 114 has reached a displacement threshold that is determined by the longitudinal length of the first hub 114 and/or the axial displacement of the second shaft 104 within the second hub 116 has reached a displacement threshold that is determined by the longitudinal length of the second hub 116. Such abnormality indicates the engagement between the first shaft 102 and the first hub 114 is about to fail and/or the engagement between the second shaft 104 and the second hub 116 is about to fail. If the FDC system 150 detects an abnormality during continuous use of the coupling 110, the FDC system 150 outputs an alarm signal to notify factory personnel the abnormal operation condition of the coupling 110. In some embodiments, the FDC system 150 also sends a control signal to stop operation of the semiconductor process tools associated with the coupling 110. In some embodiments, the FDC system 150 is implemented using a processor. In some embodiments, techniques for implementing the FDC system 150 include statistical process control (SPC), principle component analysis (PCA), partial least squares (PLS), other suitable techniques, and combinations thereof.

In some embodiments, the FDC system 150 is configured to receive information regarding intensities of transmitted light detected by the first light detector 134 and the second light detector 138, respectively. In some embodiments, the FDC system 150 is coupled to the DAQ system 140 via line 152, and thus receives parameters related to the intensities of the detected light from the DAQ system 140. In some embodiments, the FDC system 150 is directly coupled to the sensor system 130, and thus receives parameters related to intensities of detected light directly from the first and second light detectors 134 and 138. The FDC system 150 is also configured to monitor whether an intensity of the transmitted light detected by a corresponding light detector, i.e., the first light detector 134 or the second light detector 138 has risen above an intensity threshold. If the intensity of the transmitted light detected by the first light detector 134 is above an intensity threshold which indicates the displacement of the first shaft 102 has reached the displacement threshold and the engagement between the first shaft 102 and the first hub 114 is about to fail, the FDC system 150 generate an output signal to actuate an alarm and/or cause the coupling 110 to stop operating, for example. Likewise, if the intensity of the transmitted light detected by the second light detector 138 is above an intensity threshold which indicates the displacement of the second shaft 104 has reached the displacement threshold and the engagement between the second shaft 104 and the second hub 116 is about to fail, the FDC system 150 generate an output signal to actuate an alarm and/or cause the coupling 110 to stop operating, for example.

By providing through hole on each hub of a coupling, the coupling monitoring system of the present disclosure helps to determine whether shafts are properly locked within the corresponding hubs after the coupling and shafts are assembled and before operation of the coupling starts, and thus helps to prolong the operation time of the coupling. In addition, the coupling monitoring system of the present disclosure is able to in situ monitor positions of the shafts within the corresponding hubs during continuous use of the coupling, and to inform factory personnel and/or stop the operation of the semiconductor process tool before failure of the engagement between the shafts and the corresponding hubs occurs. The coupling monitoring system of the present disclosure thus helps to better manage the operation of the coupling and semiconductor process tools associated with the coupling, and thereby helps to ensure and maintain stability, repeatability and yields in the semiconductor device fabrication.

Figure 3:
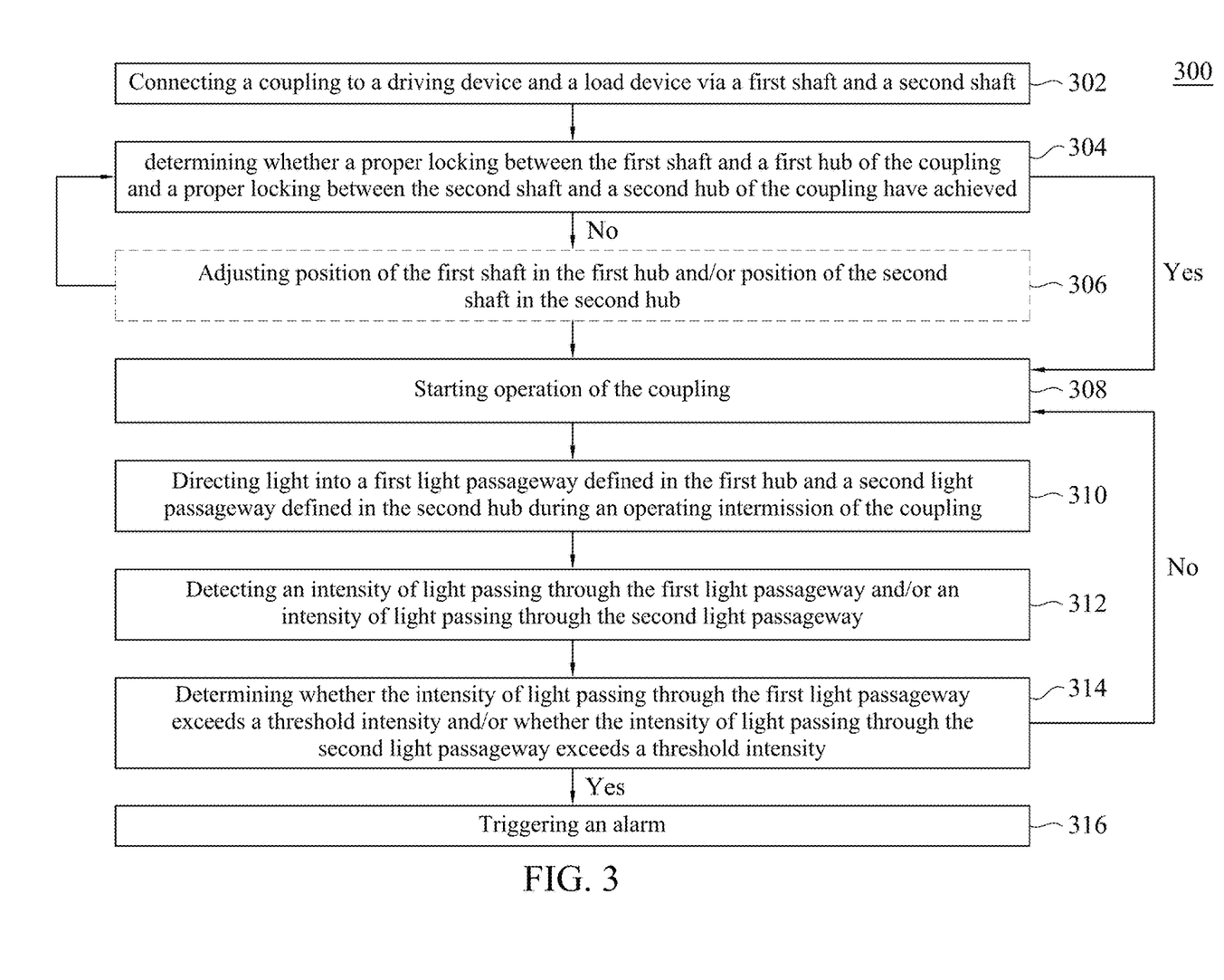
FIG. 3 is a flowchart of a method of using a coupling monitoring system, in accordance with one or more embodiments.

FIG. 3 is a flowchart of a method 300 of using a coupling monitoring system, in accordance with one or more embodiments.

In operation 302, a coupling 110 is coupled to a driving device 106 and a load device 108 via a first shaft 102 and a second shaft 104, respectively (FIGS. 1 and 2). The coupling 110 includes a main body 112, and a first hub 114 and a second hub 116 joined by the main body 112. After installation, an end portion of the first shaft 102 is received in an inner bore 118 extending axially through the first hub 114 of the coupling 110, and an end portion of the second shaft 104 is received in an inner bore 120 extending axially through a second hub 116 of the coupling 110. The first hub 114 includes a first pair of aligned through holes 122 and 124 extending through opposite walls of the first hub 114 and in optical communication with the inner bore 118. The through holes 122 and 124 and the inner bore 118 together define a first light passageway P1 in the first hub 114. The second hub 116 incudes a second pair of aligned through holes 126 and 128 extending through opposite walls of the second hub 116 and in optical communication with the inner bore 120. The through holes 126 and 128 and the inner bore 120 together define a second light passageway P2 in the second hub 116.

In operation 304, locking between the first shaft 102 and the first hub 114 and locking between the second shaft 104 and the second hub 116 are examined using an sensor system 130 (FIGS. 1 and 2) to determine whether the first shaft 102 is properly locked in the first hub 114 and whether the second shaft 104 is properly locked in the second hub 116. In some embodiments, the locking between the first shaft 102 and the first hub 114 is evaluated by directing a first light beam from a light source, e.g., a first light source 132 into the first light passageway P1. If an amount of the first light beam after passing through the first light passageway P1 is sufficient to be detected by a first light detector 134, thus indicating that the first shaft 102 is not properly positioned within the first hub 114, the method 300 proceeds to operation 306. On the other hand, if no light is allowed to pass through the first light passageway P1 or if an amount of the first light beam after passing through the first light passageway P1 is not sufficient to be detected by the first light detector 134, thus indicating that the first shaft 102 is properly positioned within the first hub 114, operation 306 is omitted and the method 300 proceeds to operation 308. Similarly, in some embodiments, the locking between the second shaft 104 and the second hub 116 is evaluated by directing a second light beam from a light source, e.g., a second light source 136 into the second light passageway P2. If an amount of the second light beam after passing through the second light passageway P2 is sufficient to be detected by a second light detector 138, thus indicating that the second shaft 104 is not properly positioned within the second hub 116, the method 300 proceeds to operation 306. On the other hand, if no light is allowed to pass through the second light passageway P2 or if an amount of second light beam after passing through the second light passageway P2 is not sufficient to be detected by the second light detector 138, thus indicating that the second shaft 104 is properly positioned within the second hub 116, operation 306 is omitted and the method 300 proceeds to operation 308.

In operation 306, position of the first shaft 102 in the first hub 114 and/or position of the second shaft 104 in the second hub 116 are adjusted. Operations 304 and 306 are repeated until the proper locking between the first shaft 102 and the first hub 114 and the proper locking between the second shaft 104 and the second hub 116 have achieved. The method 300 then proceeds to operation 308.

In operation 308, operation of the coupling 110 starts. The driving device 106 rotates the first shaft 102, which in turn rotates the second shaft 104 via the coupling 110 to drive the load device 108.

In operation 310, during an operating intermission of the coupling 110, a light beam from the first light emitter 132 is directed into the first light passageway P1 and a light beam from the second light emitter 136 is directed into the second light passageway P2.

In operation 312, the first light detector 134 monitors if there is any light transmitted through the first light passageway P1 due to the loosening of the locking between the first shaft 102 and the first hub 114, and the second light detector 138 monitors if there is any light transmitted through the second light passageway P2 due to the loosening of the locking between the second shaft 104 and the second hub 116. The light once detected by the first light detector 134 and/or the second light detector 136 indicates the axial displacement of the first shaft 102 and/or the axial displacement of the second shaft 104 had occurred.

In operation 314, the FDC system 150 determines whether an intensity of the transmitted light beam detected by the first light detector 134 exceeds an intensity threshold which indicates that further operation of the coupling 110 will result in the failure of the engagement between the first shaft 102 and the first hub 114 and/or an intensity of the transmitted light beam detected by the second light detector 138 exceeds an intensity threshold which indicates that further operation of the coupling 110 will result in the failure of the engagement between the second shaft 104 and the second hub 116. If neither the intensity of the transmitted light beam detected by the first light detector 134 nor the intensity of the transmitted light beam detected by the second light detector 138 exceeds the corresponding intensity threshold, the method 300 proceeds to operation 308 to start operation of the coupling 110 again. If the intensity of the transmitted light beam detected by the first light detector 134 exceeds the intensity threshold and/or the intensity of the transmitted light beam detected by the second light detector 138 exceeds the intensity threshold, the method proceeds to operation 316.

In operation 316, if the intensity of the transmitted light beam detected by the first light detector 134 exceeds the intensity threshold and/or the intensity of the transmitted light beam detected by the second light detector 138 exceeds the intensity threshold, an alarm is triggered to notify factory personnel. In some embodiments, a control signal is sent to stop operation of semiconductor process tools associated with the coupling 110.

In some embodiments, at least one operation is included in method 300 prior to the described operations. For example, in some embodiments, a coupling 100 containing through holes 122 and 124 or 126 and 128 on each hub 114 or 116 is provided prior to operation 302. In some embodiments, at least one operation is performed after the described operations. For example, in some embodiments, maintenance of the coupling 110 is performed after operation 316. In some embodiments, at least one operation from method 300 is omitted. For example, in some embodiments, operation 306 is omitted as described above.

Figure 4:
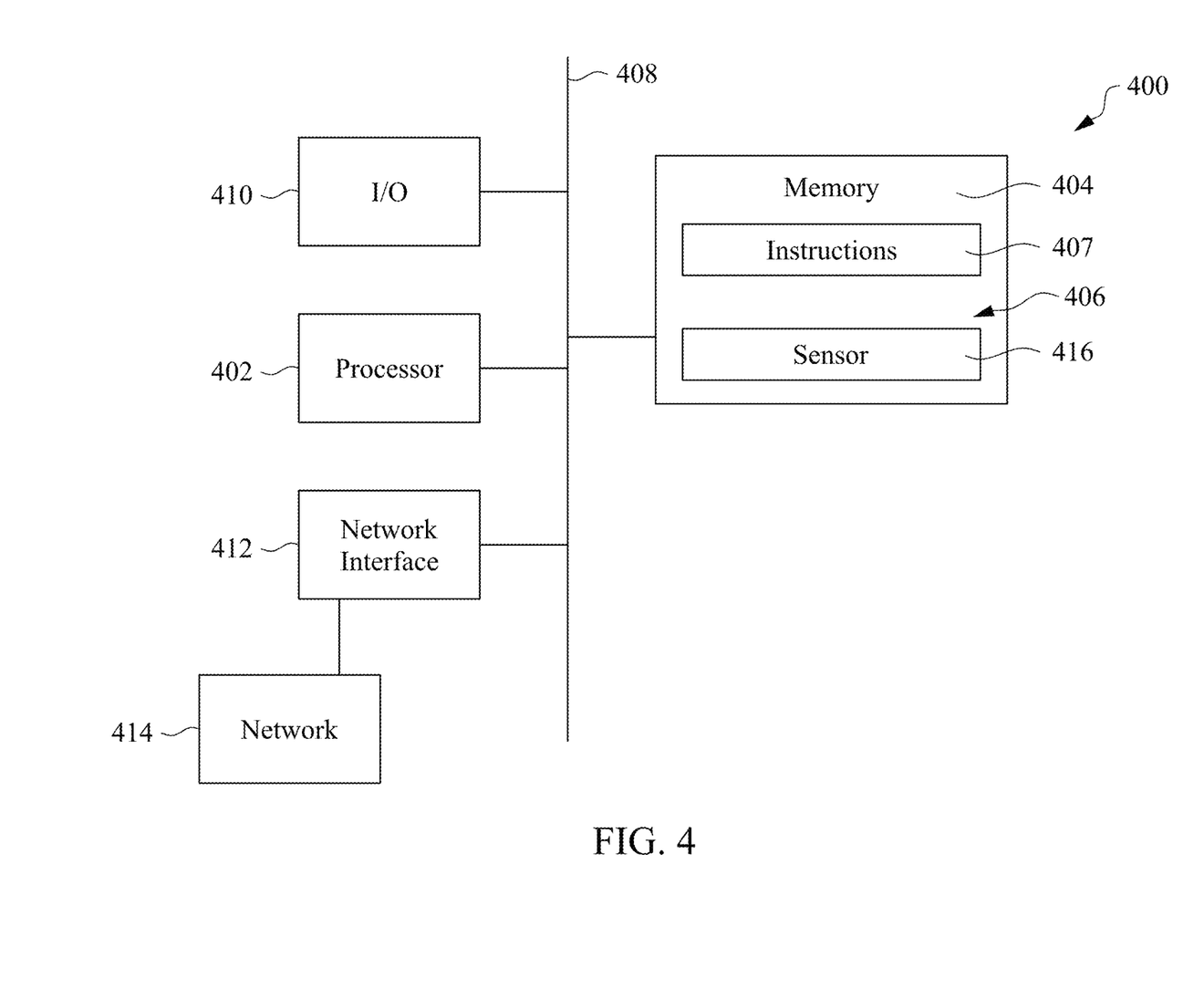
FIG. 4 is a block diagram of a computing device for controlling a coupling monitoring system, in accordance with one or more embodiments.

FIG. 4 is a block diagram of a computing device 400 for controlling a coupling monitoring system for monitoring displacements of shafts, in accordance with one or more embodiments. The computing device 400 includes a hardware processor 402 and a non-transitory, computer readable storage medium 404 encoded with, i.e., storing, the computer program code 406, i.e., a set of executable instructions. The computer readable storage medium 404 is also encoded with instructions 407 for interfacing with elements of coupling monitoring system 100. The processor 402 is electrically coupled to the computer readable storage medium 404 via a bus 408. The processor 402 is also electrically coupled to an I/O interface 410 by bus 408. A network interface 412 is also electrically connected to the processor 402 via a bus 408. The network interface 412 is connected to a network 414, so that processor 402 and computer readable storage medium 404 are capable of connecting to external elements via network 414. The processor 402 is configured to execute the computer program code 406 encoded in the computer readable storage medium 404 in order to cause computing device 400 to be usable for performing a portion or all of the operations as described with respect to the coupling monitoring system 100.

In some embodiments, the processor 402 is a central processing unit (CPU), a multi-processor, a distributed processing system, an application specific integrated circuit (ASIC), and/or a suitable processing unit.

In some embodiments, the computer readable storage medium 404 is an electronic, magnetic, optical, electromagnetic, infrared, and/or a semiconductor system (or apparatus or device). For example, the computer readable storage medium 404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-R/W), and/or a digital video disc (DVD).

In some embodiments, the storage medium 404 stores the computer program code 406 configured to cause the computing device 400 to perform the operations as described with respect to the coupling monitoring system 100. In some embodiments, the storage medium 404 also stores information needed for performing the operations as described with respect to the coupling monitoring system 100, such as sensor parameters 416, and/or a set of executable instructions to perform the operation as described with respect to the coupling monitoring system 100.

In some embodiments, the storage medium 404 stores instructions 407 for interfacing with the coupling monitoring system 100. The instructions 407 enable the processor 402 to generate operating instructions readable by elements of the coupling monitoring system 100 to effectively implement the operations as described with respect to the coupling monitoring system 100.

The computer device 400 includes I/O interface 410. The I/O interface 410 is coupled to external circuitry. In some embodiments, the I/O interface 410 includes a keyboard, keypad, mouse, trackball, trackpad, and/or cursor direction keys for communicating information and commands to the processor 402.

The computing device 400 also includes network interface 412 coupled to the processor 402. The network interface 412 allows the computing device 400 to communicate with the network 414, to which one or more other computer systems are connected. The network interface 412 includes wireless network interfaces such as BLUETOOTH, WIFI, WIMAX, GPRS, or WCDMA; or wired network interface such as ETHERNET, USB, or IEEE-1394. In some embodiments, the operations as described with respect to the coupling monitoring system 100 are implemented in two or more computing devices 400, and information such as sensor information are exchanged between different computer devices 400 via network 414.

The computing device 400 is configured to receive information related to the sensor system 130 that includes one or more light sources, e.g., first and second light sources 132 and 136 and light detectors, e.g., first and second light detectors 134 and 138 (FIG. 1 and FIG. 2), through the I/O interface 410. The information is transferred to the processor 402 via bus 408 to determine light intensities received by the light detectors 134 and 138. The transmitted light intensity/profile are then stored in the computer readable medium 404 as sensor parameter 416.

During operation, in some embodiments, the processor 402 executes a set of instructions to determine whether to the shafts 102 and/or 104 are properly locked within the corresponding hubs 114 and 116 based on sensor parameter 416. During continuous use of the coupling, the processor 402 executes a set of instructions to determine whether the displacement of first shaft 102 has reached a displacement threshold indicating that the disengagement of the first shaft 102 from the first hub 114 is about to occur and/or whether the displacement of second shaft 104 has reached a displacement threshold indicating that the disengagement of the second shaft 104 from the second hub 116 is about to occur based on sensor parameter 416. Based on the above determinations, the processor 402 generates an alarm to notify factory personnel and in some embodiments, generates a control signal to stop operation of the semiconductor process tools associated with the coupling 110. In some embodiments, the control signal is transmitted using I/O interface 410. In some embodiments, the control signal is transmitted using network interface 412.

One aspect of this description relates to a coupling. The coupling includes a main body, a first hub at a first end of the main body, and a second hub at a second end of the main body opposite the first end. The first hub includes a first inner bore configured to receive a first shaft and a pair of aligned first and second through holes extending through opposite walls of the first hub. The first through hole and the second through hole are in optical communication with the first inner bore. In some embodiments, the coupling includes a second hub includes a second inner bore configured to receive a second shaft and a pair of aligned third and fourth through holes extending through opposite walls of the second hub. The third through hole and the fourth through hole are in optical communication with the second inner bore. In some embodiments, the first through hole has the same shape as the second through hole, and the third through hole has the same shape as the fourth through hole. In some embodiments, the first through hole has a different shape from the second through hole, and the third through hole has a different shape from the fourth through hole. In some embodiments, the first through hole has the same size as the second through hole, and the third through hole has the same size as the fourth through hole. In some embodiments, the first through hole has a different size from the second through hole, and the third through hole has a different size from the fourth through hole. In some embodiments, the first and second inner bores extend along an axial direction of the coupling, and the first through hole, the second through hole, the third through hole and the fourth through hole each extend along a radial direction of the coupling transverse to the axial direction.

One aspect of this description relates to a coupling monitoring system. The coupling monitoring system includes a coupling. The coupling includes a main body, a first hub at a first end of the main body, and a second hub at a second end of the main body opposite the first end. The first hub includes a first inner bore configured to receive a first shaft and a pair of aligned first and second through holes extending through opposite walls of the first hub. The first through hole and the second through hole are in optical communication with the first inner bore to define a first light passageway. The coupling monitoring system further includes a sensor system configured to monitor a position of the first shaft in the first hub and a position of the second shaft in the second hub before an operation of the coupling starts. The coupling monitoring system further includes a fault detection and classification (FDC) system configured to identify an abnormality of the coupling before the operation of the coupling starts based on information from the sensor system. In some embodiments, the coupling further comprises a second hub at a second end of the main body opposite the first end, wherein the second hub comprises a second inner bore configured to receive a second shaft and a pair of aligned third and fourth through holes extending through opposite walls of the second hub, wherein the third through hole and the fourth through hole are in optical communication with the second inner bore to define a second light passageway. In some embodiments, the sensor system includes at least one light source configured to emit light into the first light passageway and the second light passageway, a first light detector configured to receive light passing through the first light passageway, and a second light detector configured to receive light passing through the second light passageway. In some embodiments, the at least one light source includes a first light source configured to emit light into the first light passageway, and a second light source configured to emit light into the second light passageway. In some embodiments, the first light source and the second light source are a same type of light source. In some embodiments, the first light source and the second light source are different types of light sources. In some embodiments, the first light source is a visible light source and the second light source is an infrared light source. In some embodiments, the first light source and the second light source are independently selected from the group consisting of a Xenon lamp, a laser diode, a light emitting diode, an infrared emitter, and an X-ray emitter. In some embodiments, the first light detector and the second light detector are independently sensitive to visible light or infrared light. In some embodiments, the coupling monitoring system further includes a data acquisition system configured to converted signals received from the sensor system to a signal interpretable by the FDC system.

One aspect of this description relates to a method of monitoring axial displacements of shafts in a coupling. The method includes directing light into a first through hole in a first hub of a coupling. The first hub is configured to receive a first shaft. The method further includes detecting an intensity of light exiting a second through hole in the first hub. The second through hole is aligned with the first through hole. The method further includes determining whether the detected intensity exceeds an intensity threshold. The method further includes outputting an alarm signal in response to the detected intensity exceeding the intensity threshold. In some embodiments, the method further includes sending a control signal to stop an operation of a device that is coupled to the first shaft in response to the detected intensity exceeding the intensity threshold. In some embodiments, the method further includes emitting light into a third through hole in a second hub of the coupling opposite the first hub, wherein the second hub is configured to receive a second shaft, detecting an intensity of light passing through a fourth through hole in the second hub, wherein the fourth through hole is aligned with the third through hole, determining whether the detected intensity exceeds another intensity threshold, and outputting an alarm signal in response to the detected intensity exceeding the another intensity threshold.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A coupling monitoring system, comprising:
    a coupling, comprising:
        a main body,
        a first hub at a first end of the main body, wherein the first hub comprises a first inner bore configured to receive a first shaft and a pair of aligned first and second through holes extending through opposite walls of the first hub, wherein the first through hole and the second through hole are in optical communication with the first inner bore to define a first light passageway;
    a sensor system configured to monitor a position of the first shaft in the first hub and a position of the second shaft in the second hub before an operation of the coupling starts; and
    a fault detection and classification (FDC) system configured to identify an abnormality of the coupling before the operation of the coupling starts based on information from the sensor system.

2. The coupling monitoring system of claim 1, wherein the coupling further comprises a second hub at a second end of the main body opposite the first end, wherein the second hub comprises a second inner bore configured to receive a second shaft and a pair of aligned third and fourth through holes extending through opposite walls of the second hub, wherein the third through hole and the fourth through hole are in optical communication with the second inner bore to define a second light passageway.

3. The coupling monitoring system of claim 1, wherein the sensor system comprises:
    at least one light source configured to emit light into the first light passageway and the second light passageway;
    a first light detector configured to receive light passing through the first light passageway; and
    a second light detector configured to receive light passing through the second light passageway.

4. The coupling monitoring system of claim 3, wherein the at least one light source comprises:
    a first light source configured to emit light into the first light passageway; and
    a second light source configured to emit light into the second light passageway.

5. The coupling monitoring system of claim 3, wherein the first light source and the second light source are independently a visible light source or an infrared light source.

6. The coupling monitoring system of claim 3, wherein the first light source and the second light source are different types of light sources.

7. The coupling monitoring system of claim 3, wherein the first light source is a visible light source and the second light source is an infrared light source.

8. The coupling monitoring system of claim 3, wherein the first light source and the second light source are independently selected from the group consisting of a Xenon lamp, a laser diode, a light emitting diode, an infrared emitter, and an X-ray emitter.

9. The coupling monitoring system of claim 2, wherein the first light detector and the second light detector are independently sensitive to visible light or infrared light.

10. The coupling monitoring system of claim 1, further comprising a data acquisition system configured to convert signals received from the sensor system to a signal interpretable by the FDC system.

11. A method for monitoring axial displacements of shafts in a coupling, comprising:
    emitting light into a first through hole in a first hub of a coupling, wherein the first hub is configured to receive a first shaft;
    detecting an intensity of light exiting a second through hole in the first hub, wherein the second through hole is aligned with the first through hole;
    determining whether the detected intensity exceeds an intensity threshold; and
    outputting an alarm signal in response to the detected intensity exceeding the intensity threshold.

12. The method of claim 11, further comprising sending a control signal to stop an operation of a device that is coupled to the coupling in response to the detected intensity exceeding the intensity threshold.

13. The method of claim 11, further comprising:
    emitting light into a third through hole in a second hub of the coupling opposite the first hub, wherein the second hub is configured to receive a second shaft;
    detecting an intensity of light passing through a fourth through hole in the second hub, wherein the fourth through hole is aligned with the third through hole;
    determining whether the detected intensity exceeds another intensity threshold; and
    outputting an alarm signal in response to the detected intensity exceeding the another intensity threshold.

14. A coupling monitoring system, comprising:
    a sensor system comprising:
        a first transmitter configured to transmit a first signal into a first opening in a coupling; and
        a first receiver configured to receive a second signal from a second opening in the coupling, wherein the first opening is aligned with the second opening across an inner bore of the coupling;
    a data acquisition system (DAS) configured to receive at least one signal from the sensor system; and
    a fault detection and classification (FDC) system configured to receive an output of the DAS, wherein the FDC is configured to identify an abnormality of the coupling based on the output from the DAS, and the FDC is configured to determine a fit of a first shaft in the coupling based on the output from the DAS.

15. The coupling monitoring system of claim 14, wherein the FDC is configured to generate an alarm in response to identifying the abnormality.

16. The coupling monitoring system of claim 14, wherein the first receiver is configured to receive the second signal having a first magnitude in a situation where the coupling is free of the abnormality, the first receiver is configured to receive the second signal having a second magnitude in a situation where the coupling includes the abnormality, and the second magnitude is greater than the first magnitude.

17. The coupling monitoring system of claim 14, wherein the first transmitter is configured to emit the first signal comprising an optical signal.

18. The coupling monitoring system of claim 14, wherein the sensor system further comprises:
- a second transmitter configured to transmit a third signal into a third opening in the coupling; and
- a second receiver configured to receive a fourth signal from a fourth opening in the coupling, and the third opening is aligned with the fourth opening across the inner bore of the coupling.

19. The coupling monitoring system of claim 18, wherein the DAS is configured to receive an output from each of the first receiver and the second receiver.

20. The coupling monitoring system of claim 18, wherein the second transmitter is spaced from the first transmitter in a direction parallel to an axis the inner bore of the coupling.

* * * * *